US012722423B2

(12) United States Patent
Eguchi

(10) Patent No.: US 12,722,423 B2
(45) Date of Patent: Sep. 1, 2026

(54) NON-PNEUMATIC TIRE

(71) Applicant: BRIDGESTONE CORPORATION, Tokyo (JP)

(72) Inventor: Shinichi Eguchi, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 435 days.

(21) Appl. No.: 18/558,537

(22) PCT Filed: Dec. 1, 2021

(86) PCT No.: PCT/JP2021/044159
§ 371 (c)(1),
(2) Date: Nov. 2, 2023

(87) PCT Pub. No.: WO2022/239282
PCT Pub. Date: Nov. 17, 2022

(65) Prior Publication Data

US 2024/0217270 A1 Jul. 4, 2024

(30) Foreign Application Priority Data

May 13, 2021 (JP) ................................ 2021-081922

(51) Int. Cl.
*B60C 1/00* (2006.01)
*B60C 7/10* (2006.01)
(Continued)

(52) U.S. Cl.
CPC ................ *B60C 1/00* (2013.01); *C08L 67/03* (2013.01); *B60C 2001/0091* (2013.01);
(Continued)

(58) Field of Classification Search
CPC ... B60C 1/00; B60C 2001/0091; B60C 7/107; B60C 7/143; B60C 7/146; C08L 67/03
See application file for complete search history.

(56) References Cited

U.S. PATENT DOCUMENTS 3,977,454 A 8/1976 Coran et al.
4,921,029 A 5/1990 Palinkas et al.
(Continued)

FOREIGN PATENT DOCUMENTS

CN 108367596 A 8/2018
CN 111344161 A 6/2020
(Continued)

OTHER PUBLICATIONS

Jan. 25, 2022, International Search Report issued in the International Patent Application No. PCT/JP2022/044159.
(Continued)

*Primary Examiner* — Kip T Kotter
(74) *Attorney, Agent, or Firm* — KENJA IP LAW PC

(57) ABSTRACT

The problem of this disclosure is to provide a non-pneumatic tire that achieves both ride comfort and durability, even in a small diameter size. The solution is a non-pneumatic tire (1) using a resin composition as a skeletal member, wherein the resin composition has a bending modulus of elasticity of 247 MPa or less at −20° ° C. in accordance with ISO 178 and a bending modulus of elasticity of 32 MPa or more at 60° C. in accordance with ISO 178, and a tire diameter D in the tire radial direction is 35 cm or less.

8 Claims, 1 Drawing Sheet

(51) Int. Cl.
*B60C 7/14* (2006.01)
*C08L 67/03* (2006.01)

(52) U.S. Cl.
CPC .............. *B60C 7/107* (2021.08); *B60C 7/143* (2013.01); *C08L 2205/025* (2013.01); *C08L 2207/04* (2013.01)

(56) References Cited

U.S. PATENT DOCUMENTS

| | | | |
|---|---|---|---|
| 9,511,632 | B2 | 12/2016 | Fudemoto et al. |
| 11,590,801 | B2 | 2/2023 | Kim et al. |
| 11,654,716 | B2 | 5/2023 | Eguchi |
| 2014/0367007 | A1* | 12/2014 | Thompson ............. B29D 30/02 152/17 |
| 2015/0258853 | A1* | 9/2015 | Fudemoto ................. B60C 7/14 152/80 |
| 2018/0361796 | A1 | 12/2018 | Suzuki et al. |
| 2020/0262241 | A1 | 8/2020 | Eguchi |
| 2020/0277012 | A1 | 9/2020 | Thompson et al. |
| 2020/0331221 | A1 | 10/2020 | Thompson et al. |
| 2022/0010102 | A1 | 1/2022 | Matsushita |

FOREIGN PATENT DOCUMENTS

| | | | |
|---|---|---|---|
| EP | 2896510 | A1 | 7/2015 |
| EP | 3156258 | A1 | 4/2017 |
| EP | 3708386 | A1 | 9/2020 |
| JP | S5131402 | A | 3/1976 |
| JP | S58401 | A | 1/1983 |
| JP | H02310102 | A | 12/1990 |
| JP | 2012046034 | A | 3/2012 |
| JP | 2014125081 | A | 7/2014 |
| WO | 2014103723 | A1 | 7/2014 |
| WO | 2019093212 | A1 | 5/2019 |
| WO | 2019093747 | A1 | 5/2019 |
| WO | 2020105438 | A1 | 5/2020 |

OTHER PUBLICATIONS

Sep. 10, 2024, search result of the Extended European Search Report issued by the European Patent Office in the corresponding European Patent Application No. 21942010.6.

Nov. 14, 2023, International Preliminary Report on Patentability issued in the International Patent Application No. PCT/JP2021/044159.

May 14, 2025, search result of Office Action issued by the China National Intellectual Property Administration in the corresponding Chinese Patent Application No. 202180098090.0.

* cited by examiner

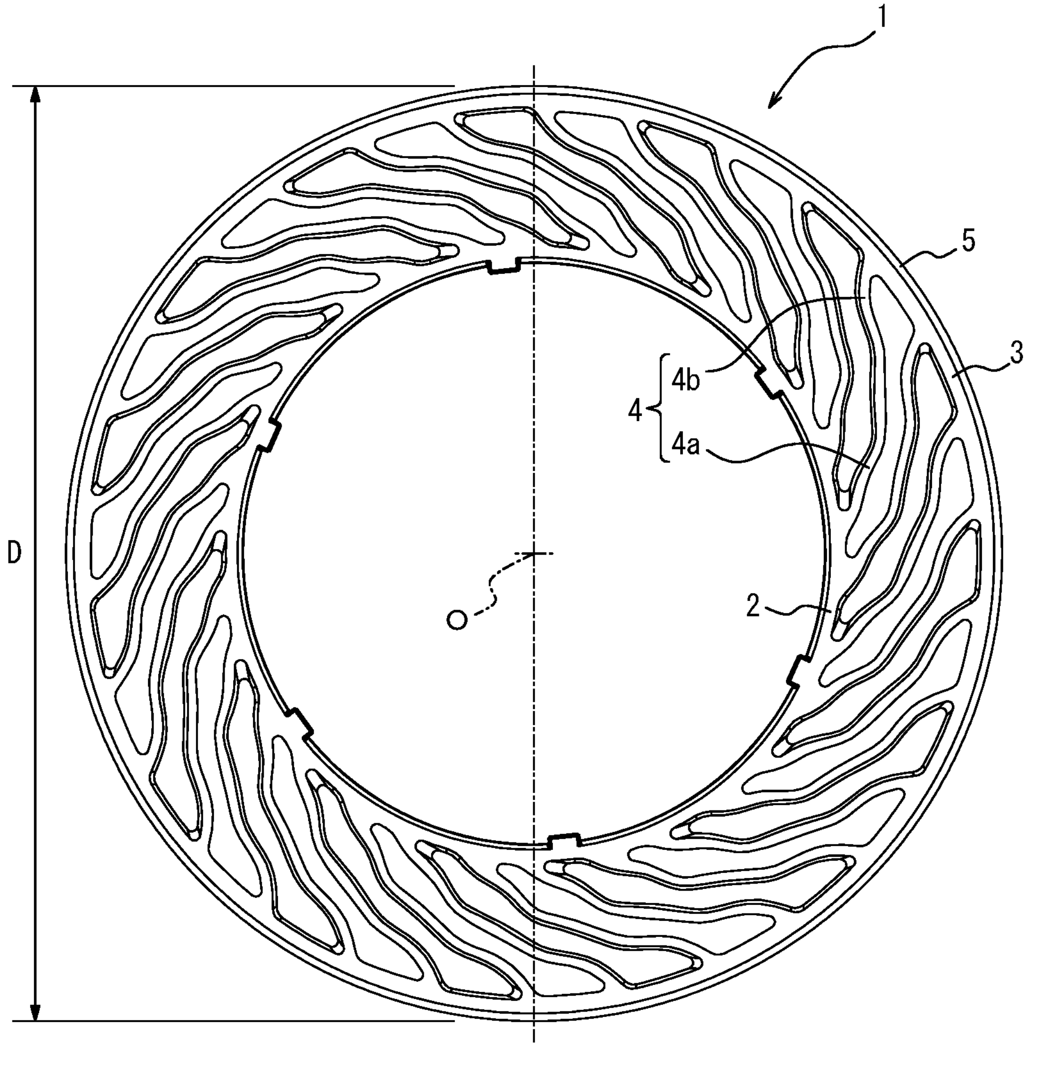
1
5
3
4b
4
4a
2
D

NON-PNEUMATIC TIRE

TECHNICAL FIELD

This disclosure relates to a non-pneumatic tire.

BACKGROUND

In recent years, tires that do not require pressurized air to be filled inside have been proposed to avoid the occurrence of punctures.

For example, the following Patent Document 1 (PTL 1) discloses a non-pneumatic tire includes an attachment body attached to an axle, a ring member including an inner rim fitted onto the attachment body and an outer rim configured to surround the inner rim from the outside in a tire radial direction, and a plurality of connecting members disposed between the inner rim and the outer rim in a tire circumferential direction and configured to connect these two rims so that they can be relatively elastically displaced.

In addition, the following Patent Document 1 (PTL 1) discloses that ride comfort can be improved by integrally forming the ring member and the connecting members of the non-pneumatic tire with a synthetic resin material that specifies a magnification ratio between the bending elastic modulus at −20° C. and at 60° C.

CITATION LIST

Patent Literature

PTL 1: JP 2014-125081 A

SUMMARY

Technical Problem

However, the inventor has examined the non-pneumatic tire disclosed in the above Patent Document 1 (PTL 1) and found that there is room for improvement in both ride comfort and durability in the case of small diameter sizes.

Therefore, the present disclosure is to solve the problems of the above conventional technologies and to provide a non-pneumatic tire that achieves both ride comfort and durability, even in a small diameter size.

Solution to Problem

The gist structure of this disclosure, which solves the above issues, is as follows.

The non-pneumatic tire according to this disclosure is a non-pneumatic tire using a resin composition as a skeletal member, wherein the resin composition has a bending modulus of elasticity of 247 MPa or less at −20° C. in accordance with ISO 178 and a bending modulus of elasticity of 32 MPa or more at 60° C. in accordance with ISO 178, and a tire diameter in the tire radial direction is 35 cm or less.

In the present disclosure, the bending modulus of elasticity is the value obtained by a three-point bending test in accordance with "ISO 178: 2010 Method A".

Advantageous Effect

The present disclosure provides a non-pneumatic tire that achieves both ride comfort and durability, even in a small diameter size.

BRIEF DESCRIPTION OF THE DRAWINGS

In the accompanying drawings:

FIG. 1 is a schematic illustration of the configuration of the non-pneumatic tire according to one embodiment of this disclosure, viewed from the side of the tire.

DETAILED DESCRIPTION

The following is a detailed illustrative description of the non-pneumatic tire based on the embodiments of this disclosure.

The non-pneumatic tire according to this disclosure is a non-pneumatic tire that uses a resin composition as a skeletal member.

The skeletal member of the non-pneumatic tire refers to the member that constitutes the tire skeleton, more specifically, the member that supports the tread member from the inside to the outside of the tire in order to maintain the shape of the tire tread. For example, it refers to the ring member (inner rim and outer rim) and the connecting members (spoke structure), etc., in a non-pneumatic tire.

In the non-pneumatic tire according to this disclosure, the resin composition used for the skeletal member has a bending modulus of elasticity of 247 MPa or less at −20° C. in accordance with ISO 178 and a bending modulus of elasticity of 32 MPa or more at 60° C. in accordance with ISO 178. Also, the non-pneumatic tire according to this disclosure is characterized in that a tire diameter in the tire radial direction is 35 cm or less.

Although the bending modulus of elasticity of a resin composition generally tends to decrease as the temperature increases, if the bending modulus of elasticity at 60° C. of the resin composition used for the skeletal member is 32 MPa or more, the skeletal member will not become too soft even at relatively high temperatures, providing a good ride comfort and sufficient durability when driving a vehicle equipped with the non-pneumatic tires. On the other hand, although the bending modulus of elasticity of a resin composition generally tends to increase as the temperature decreases, if the bending modulus of elasticity at −20° C. of the resin composition used for the skeletal member is 247 MPa or less, the skeletal member does not become too stiff even at relatively low temperatures, resulting in a good ride comfort, and the skeletal member does not become too stiff and brittle, resulting in excellent durability. Therefore, the non-pneumatic tire of the present disclosure can provide both ride comfort and durability over a wide temperature range, even when the tire diameter in the tire radial direction is as small as 35 cm or less.

The bending modulus of elasticity at −20° C. of the resin composition used for the skeletal member is 247 MPa or less, preferably 234 MPa or less, more preferably 170 MPa or less, and is usually 80 MPa or more, preferably 90 MPa or more. If the bending modulus of elasticity at −20° C. exceeds 247 MPa, the skeletal member becomes too rigid, resulting in severe vibration transmitted from the tire, which deteriorates ride comfort, and also the skeletal member becomes too rigid and brittle, which deteriorates durability. If the bending modulus of elasticity at −20° C. is 90 MPa or more, resulting in improving ride comfort and durability in a low-temperature environment in a well-balanced manner.

The bending modulus of elasticity at 60° C. of the resin composition used for the skeletal member is 32 MPa or more, preferably 34 MPa or more, more preferably 36 MPa or more, and is usually 90 MPa or less, preferably 70 MPa or less. If the bending modulus of elasticity at 60° C. is less than 32 MPa, the skeletal member may become too soft, which may worsen ride comfort when driving a vehicle equipped with the non-pneumatic tires, and may also reduce durability. If the bending modulus of elasticity at 60° C. is 70 MPa or less, resulting in improving ride comfort and durability in a high-temperature environment in a well-balanced manner.

The bending modulus of elasticity at 0° C. of the resin composition used for the skeletal member is usually 61 MPa or more, preferably 70 MPa or more, and is usually 159 MPa or less, preferably 130 MPa or less. If the bending modulus of elasticity at 0° C. is 70 MPa or more, ride comfort in the low-temperature environment is further improved, and if the bending modulus of elasticity at 0° C. is 130 MPa or less, ride comfort and durability in the low-temperature environment are improved in a well-balanced manner.

The bending modulus of elasticity at 23° C. of the resin composition used for the skeletal member is usually 53 MPa or more, preferably 60 MPa or more, and is usually 127 MPa or less, preferably 115 MPa or less. If the bending modulus of elasticity at 23° C. is 60 MPa or more, ride comfort at room temperature is further improved, and if the bending modulus of elasticity at 23° C. is 115 MPa or less, ride comfort and durability at the room temperature are improved in a well-balanced manner.

The bending modulus of elasticity at 40° ° C. of the resin composition used for the skeletal member is usually 40 MPa or more, preferably 44 MPa or more, and is usually 96 MPa or less, preferably 84 MPa or less. If the bending modulus of elasticity at 40° C. is 44 MPa or more, ride comfort in the high-temperature environment is further improved, and if the bending modulus of elasticity at 40° C. is 84 MPa or less, ride comfort and durability in the high-temperature environment are improved in a well-balanced manner.

The resin component in the resin composition for the aforementioned skeletal member is preferably a thermoplastic elastomer and a thermoplastic resin, and the thermoplastic elastomer is more preferred. In addition to the resin component, various additives can be added to the resin composition. The content of the resin component in the resin composition is preferably 80% by mass or more, and more preferably 90% by mass or more.

The thermoplastic elastomer and the thermoplastic resin are polymeric compounds in which the material softens and flows with increasing temperature and becomes relatively hard and strong upon cooling. In this document, the polymeric compounds that soften and flow with increasing temperature and become relatively hard and strong upon cooling, and having rubber-like elasticity are the thermoplastic elastomer; the polymeric compounds that soften and flow with increasing temperature and become relatively hard and strong upon cooling, and not having rubber-like elasticity are the thermoplastic resin; and these are distinguished.

In addition, the "thermoplastic elastomer" is a thermoplastic resin material having a hard segment and a soft segment in its molecule. In detail, it refers to a polymeric compound having elasticity, and to a thermoplastic resin material composed of a copolymer which includes a polymer constituting a hard segment, that is crystalline and has a high melting point, and a polymer constituting a soft segment, that is amorphous and has a low glass transition temperature. Note, the thermoplastic elastomer in the present disclosure does not encompass vulcanized rubber such as natural rubber and synthetic rubber.

The thermoplastic elastomer includes polyester-based thermoplastic elastomer (TPC), polyamide-based thermoplastic elastomer (TPA), polyolefin-based thermoplastic elastomer (TPO), polystyrene-based thermoplastic elastomer (TPS), and so on. Among these, the polyester-based thermoplastic elastomer (TPC) is preferred from the standpoint of durability and cost.

The polyester-based thermoplastic elastomer (TPC) refers to a polymeric compound having elasticity, and a thermoplastic resin material composed of a copolymer which includes a polymer constituting a hard segment, that is crystalline and has a high melting point, and a polymer constituting a soft segment, that is amorphous and has a low glass transition temperature, having an ester bond in the main chain of the polymer constituting the hard segment.

As the crystalline polyester forming the hard segment of the polyester-based thermoplastic elastomer (TPC), an aromatic polyester can be used. The aromatic polyester can be formed, for example, from an aromatic dicarboxylic acid or an ester-forming derivatives thereof and an aliphatic diol. The aromatic polyester forming the hard segment includes, for example, polyethylene terephthalate, polybutylene terephthalate, polystyrene terephthalate, polyethylene naphthalate, polybutylene naphthalate, etc., and the polybutylene terephthalate is preferred.

One suitable aromatic polyester forming the hard segment includes polybutylene terephthalate derived from terephthalic acid and/or dimethyl terephthalate and 1,4-butanediol. In addition, it may be a polyester derived from a dicarboxylic acid component such as isophthalic acid, phthalic acid, naphthalene-2,6-dicarboxylic acid, naphthalene-2,7-dicarboxylic acid, diphenyl-4,4'-dicarboxylic acid, diphenoxyethanedicarboxylic acid, 5-sulfoisophthalic acid, or ester-forming derivatives thereof, and a diol component such as ethylene glycol, trimethylene glycol, pentamethylene glycol, hexamethylene glycol, neopentyl glycol, decamethylene glycol, 1,4-cyclohexane dimethanol, tricyclodecane dimethylol, xylylene glycol, bis(p-hydroxy) diphenyl, bis(p-hydroxyphenyl) propane, 2,2-bis[4-(2-hydroxyethoxy) phenyl] propane, bis[4-(2-hydroxy) phenyl]sulfone, 1,1-bis[4-(2-hydroxyethoxy) phenyl] cyclohexane, 4,4'-dihydroxy-p-terphenyl, 4,4'-dihydroxy-p-quarterphenyl; or a copolymerized polyester that combine two or more of these dicarboxylic acid components and diol components.

The polymer forming the soft segment of the polyester-based thermoplastic elastomer (TPC) includes, for example, a polymer selected from aliphatic polyethers and aliphatic polyesters.

The aliphatic polyethers include poly (ethylene oxide) glycol, poly (propylene oxide) glycol, poly (tetramethylene oxide) glycol, poly (hexamethylene oxide) glycol, copolymer of ethylene oxide and propylene oxide, ethylene oxide addition polymer of poly (propylene oxide) glycol, copolymer of ethylene oxide and tetrahydrofuran, and so on.

The aliphatic polyesters include poly (ε-caprolactone), polyenant lactone, polycaprilolactone, polybutylene adipate, polyethylene adipate, and so on.

Among these aliphatic polyethers and aliphatic polyesters, from the viewpoint of elastic properties of the resulting copolymers, poly (tetramethylene oxide) glycol, ethylene oxide addition polymer of poly (propylene oxide) glycol, poly (ε-caprolactone), polybutylene adipate, polyethylene adipate, etc., are preferred.

The polyester-based thermoplastic elastomer can be synthesized by copolymerizing polymers forming the hard segment and the soft segment by known methods. Alternatively, commercially available products can be also used as the polyester-based thermoplastic elastomer; such as the "PELPRENE" series (P30B, P40B, P40H, P-46D01, P55B, P70B, P90B, P120B, P150B, P280B P450B, P150M, S1001, S2001, S5001, S6001, S9001, etc.) manufactured by Toyobo Co., Ltd, and the "Hytrel" series (e.g., 3046, 5557, 5577, 5577R-07, 6347, 4047, 4767, 4767N, 4777, etc.) manufactured by DuPont-Toray Co., Ltd.

The polyamide-based thermoplastic elastomer (TPA) mentioned above refers to a polymeric compound having elasticity, and a thermoplastic resin material composed of a copolymer which includes a polymer constituting a hard segment, that is crystalline and has a high melting point, and a polymer constituting a soft segment, that is amorphous and has a low glass transition temperature, having an amide bond (—CONH—) in the main chain of the polymer constituting the hard segment.

The polyamide-based thermoplastic elastomer includes materials in which at least polyamide constitutes the hard segment, that is crystalline and has a high melting point, and other polymers (e.g., polyester, polyether, and so on) constitute the soft segment, that is amorphous and has a low glass transition temperature.

The crystalline polyamide constituting the hard segment of the polyamide-based thermoplastic elastomer (TPA) includes aliphatic polyamides such as polycaproamide (Nylon-6), poly-ω-aminoheptanoic acid (Nylon-7), poly-ω-aminononanoic acid (Nylon-9), poly-undecanoamide (Nylon-11), poly-lauryllactam (Nylon-12), poly-ethylenediamine adipamide (Nylon-2,6), poly-tetramethylene adipamide (Nylon-4,6), poly-hexamethylene adipamide (Nylon-6,6), poly-hexamethylene sebacamide (Nylon-6,10), poly-hexamethylene dodecanamide (Nylon-6,12), poly-octamethylene adipamide (Nylon-8,6) and poly-decamethylene adipamide (Nylon-10,8); and crystalline aromatic polyamides obtained through polycondensation reactions between aromatic diamines such as meta-xylenediamine and para-xylenediamine, and dicarboxylic acids such as adipic acid, suberic acid, sebacic acid, cyclohexane dicarboxylic acid, terephthalic acid and isophthalic acid, or derivatives thereof. Among these, Nylon-6, Nylon-6,6, and Nylon-12 are preferred, and Nylon-12 is more preferred.

The polymer constituting the soft segment of the polyamide-based thermoplastic elastomer (TPA) includes, for example, a polymer selected from polymethylene and aliphatic polyether.

The aliphatic polyether includes poly (ethylene oxide) glycol, poly (propylene oxide) glycol, poly (tetramethylene oxide) glycol, poly (hexamethylene oxide) glycol, copolymers of ethylene oxide and propylene oxide, ethylene oxide addition polymers of poly (propylene oxide) glycol, copolymers of ethylene oxide and tetrahydrofuran, and so on.

The polyamide-based thermoplastic elastomer can be synthesized by copolymerizing the polymer forming the hard segment and the polymer forming the soft segment by known methods. Alternatively, commercially available products can be also used as the polyamide-based thermoplastic elastomer; such as the "UBESTA XPA" series (e.g., XPA9063X1, XPA9055X1, XPA9048X2, XPA9048X1, XPA9040X1, XPA9040X2, XPA9044, XPA9048, XPA9055, etc.) manufactured by Ube Corporation, and the "BESTAMID" series (e.g., E40-S3, E47-S1, E47-S3, E55-S 1, E55-S3, EX9200, E50-R2) manufactured by Daisel Evonic Corporation.

The polyolefin-based thermoplastic elastomer (TPO) mentioned above refers to a polymeric compound having elasticity, and a thermoplastic resin material composed of a copolymer which includes a polymer constituting a hard segment, that is crystalline and has a high melting point, and a polymer constituting a soft segment, that is amorphous and has a low glass transition temperature, in which the polymer constituting the hard segment is a polyolefin such as polypropylene or polyethylene.

The polyolefin-based thermoplastic elastomer includes materials in which at least polyolefin constitutes the hard segment, that is crystalline and has a high melting point, and the polyolefin and olefins other than that polyolefin constitute the soft segment, that is amorphous and has a low glass transition temperature.

The polyolefin forming the hard segment of the polyolefin-based thermoplastic elastomer includes, for example, polypropylene, isotactic polypropylene, polyethylene, poly-1-butene, and so on.

The polymer that constitutes the soft segment of the polyolefin-based thermoplastic elastomer includes, for example, ethylene-propylene copolymer, propylene-1-hexene copolymer, propylene-4-methyl-1-pentene copolymer, propylene-1-butene copolymer, ethylene-1-hexene copolymer, ethylene-4-methyl-pentene copolymer, ethylene-1-butene copolymer, 1-butene-1-hexene copolymer, 1-butene-4-methyl-pentene copolymer, and so on.

The polyolefin-based thermoplastic elastomer can be synthesized by copolymerizing polymers constituting the hard segment and the soft segment by known methods. Alternatively, commercially available products can be also used as the polyolefin-based thermoplastic elastomer; such as Prime TPO® manufactured by Prime Polymer Co., Ltd., TAFMER® and NOTIO® manufactured by Mitsui Chemicals, Inc.

The polystyrene-based thermoplastic elastomer (TPS) refers to a polymeric compound having elasticity, and a thermoplastic resin material composed of a copolymer which includes a polymer constituting a hard segment and a polymer constituting a soft segment, that is amorphous and has a low glass transition temperature, in which the polymer constituting the hard segment is polystyrene or a polystyrene derivative.

The polystyrene-based thermoplastic elastomer is not particularly limited, but includes copolymers in which polystyrene constitutes the hard segment and an amorphous polymer constitutes the soft segment with a low glass transition temperature (e.g., polyethylene, polybutadiene, polyisoprene, hydrogenated polybutadiene, hydrogenated polyisoprene, poly(2,3-dimethyl-butadiene), etc.).

The polystyrene-based thermoplastic elastomer can be synthesized by copolymerizing polymers constituting the hard segment and the soft segment by block copolymerization or other known methods. Alternatively, commercially available products can be also used as the polystyrene-based thermoplastic elastomer; such as TUFPRENE® and TUFTEC® manufactured by Asahi Kasei Corp. and SEPTON® manufactured by Kuraray Co., Ltd.

The thermoplastic resin mentioned above includes polyester resin, polyamide resin, polyolefin resin, and polystyrene resin, etc. Among these, the polyester resin is preferred from the standpoint of durability and cost.

The polyester resin is a resin having an ester bond in the main chain. The polyester resin is not particularly limited, but crystalline polyester is preferred. As the crystalline polyester, aromatic polyesters can be used. The aromatic polyesters can be formed, for example, from an aromatic dicarboxylic acid or an ester-forming derivative thereof and an aliphatic diol.

The aromatic polyesters include, for example, polyethylene terephthalate, polybutylene terephthalate, polystyrene terephthalate, polyethylene naphthalate and polybutylene naphthalate, and the polybutylene terephthalate is preferred.

One of the aromatic polyesters is polybutylene terephthalate derived from terephthalic acid and/or dimethyl terephthalate and 1,4-butanediol, in addition, it may be a polyester derived from: a dicarboxylic acid component such as isophthalic acid, phthalic acid, naphthalene-2,6-dicarboxylic acid, naphthalene-2,7-dicarboxylic acid, diphenyl-4,4'-dicarboxylic acid, diphenoxyethanedicarboxylic acid, 5-sulfoisophthalic acid, or their ester-forming derivatives; and a diol or the like with a molecular weight of 300 or less {e.g., aliphatic diols such as ethylene glycol, trimethylene glycol, pentamethylene glycol, hexamethylene glycol, neopentyl glycol, and decamethylene glycol, alicyclic diols such as 1,4-cyclohexanedimethanol and tricyclodecane dimethylol, and aromatic diols such as xylylene glycol, bis(p-hydroxy) diphenyl, bis(p-hydroxyphenyl) propane, 2,2-bis[4-(2-hydroxyethoxy) phenyl] propane, bis[4-(2-hydroxy) phenyl] sulfone, 1,1-bis[4-(2-hydroxyethoxy) phenyl] cyclohexane, 4,4'-dihydroxy-p-terphenyl, 4,4'-dihydroxy-p-quaterphenyl}, or it may be a copolymerized polyester made by combining two or more of these dicarboxylic acid components and diol components. It is also possible to copolymerize trifunctional or more of multifunctional carboxylic acid components, multifunctional oxyacid components, and multifunctional hydroxy components, etc., in the range of 5 mol % or less.

Alternatively, commercially available products can be also used as the polyester resin; such as the "DURANEX" series (e.g., 2000, 2002, etc.) manufactured by Polyplastics Co., Ltd, the "NOVADURAN" series (e.g., 5010R5, 5010R3-2, etc.) manufactured by Mitsubishi Engineering-Plastics Corporation, the "TORAYCON" series (e.g., 1401X06, 1401X31, 1401X70, etc.) manufactured by Toray Industries, and "PLANAC" series (e.g., BT-1000) manufactured by Toyobo Co., Ltd.

The aforementioned polyamide resin is a resin having an amide bond (—NHCO—) in the main chain. The polyamide resin includes, for example, aliphatic polyamides such as polycapramide (Nylon-6), poly-ω-aminoheptanoic acid (Nylon-7), poly-ω-amino-nonanoic acid (Nylon-9), polyundecanamide (Nylon-11), poly-lauryllactam (Nylon-12), poly-ethylenediamine adipamide (Nylon-2,6), poly-tetramethylene adipamide (Nylon-4,6), poly-hexamethylene adipamide (Nylon-6,6), poly-hexamethylene sebacamide (Nylon-6,10), Poly-hexamethylene dodecanamide (Nylon-6,12), poly-octamethylene adipamide (Nylon-8,6) and poly-decamethylene adipamide (Nylon-10,8); and crystalline aromatic polyamides obtained through polycondensation reaction between aromatic diamines such as meta-xylenediamine and para-xylenediamine, and dicarboxylic acids such as adipic acid, suberic acid, sebacic acid, cyclohexane dicarboxylic acid, terephthalic acid and isophthalic acid, or their derivatives. Among these, Nylon-6, Nylon-6,6, and Nylon-12, etc., are preferred, and Nylon-12 is more preferred.

Alternatively, commercially available products can be also used as the polyamide resin; such as UBESTA (e.g., 3014U, 3020U, etc.) manufactured by Ube Corporation, and VESTAMID (e.g., L1600, L1700, etc.) manufactured by Daisel Evonic Corporation.

The aforementioned polyolefin resin is a polymer whose main chain is a polymer of olefin such as ethylene, propylene, and 1-butene. The polyolefin resin includes, for example, polyethylene, polypropylene, polybutene, cycloolefin-based resins, copolymers of these resins, and so on. Among these, polyethylene, polypropylene and ethylene-propylene copolymer are preferred, and polypropylene and ethylene-propylene copolymer are more preferred.

Alternatively, commercially available products can be also used as the polyolefin resin; such as Prime PP® manufactured by Prime Polymer Co., Ltd, and Novatec PP®, WINTEC® manufactured by Nippon Polypropylene Corporation.

The aforementioned polystyrene resin is a polymer of styrene. Commercially available products can be used as the polystyrene resin; such as XAREC® manufactured by Idemitsu Kosan Co., Ltd, Toyo Styrol® manufactured by Toyo Styrene Co., Ltd, and CEVIAN manufactured by Daicel Polymer Co., Ltd.

In the non-pneumatic tire of the present disclosure, it is preferred that the resin composition contains a thermoplastic elastomer having a hard segment and a soft segment in its molecule. The non-pneumatic tire using a resin composition containing a thermoplastic elastomer with a hard segment and a soft segment in its molecule as a skeletal member improves ride comfort over a wide temperature range, as well as enhances durability.

Here, it is preferred that the thermoplastic elastomer is a polyester-based thermoplastic elastomer. The non-pneumatic tire using a resin composition containing a polyester-based thermoplastic elastomer as a skeletal member further improves ride comfort over a wide temperature range and further enhances durability.

In addition, it is further preferred that the hard segment of the polyester-based thermoplastic elastomer is polybutylene terephthalate. The resin composition containing a polyester-based thermoplastic elastomer in which the hard segment is polybutylene terephthalate has high strength, and the non-pneumatic tire using such resin composition as a skeletal member has low flexure and particularly good ride comfort and durability.

The resin composition used for the skeletal member may contain additives in addition to the thermoplastic elastomer, thermoplastic resin, and other resin components described above. The additives to be added to the resin composition include weather resistant anti-aging agents, heat resistant anti-aging agents, moisture/heat resistant additives, antistatic agents, lubricants, crystal nucleating agents, tackifiers, antifogging agents, mold release agents, plasticizers, fillers, pigments, dyes, fragrances, flame retardants, and so on. Among these, the weather resistant anti-aging agents, the heat resistant anti-aging agents and the moisture/heat resistant additives are preferred, and the weather resistant anti-aging agents and the heat resistant anti-aging agents are more preferred. The addition of the weather resistant anti-aging agents or the heat resistant anti-aging agents to the resin composition improves the stability of the resin composition, and the non-pneumatic tire using such resin composition as a skeletal member can maintain the desired properties over a long period of time. The total content of these additives is preferably 20 parts by mass or less, more preferably 10 parts by mass or less, per 100 parts by mass of the resin component.

The weather resistant anti-aging agents are additives that act to improve the weather resistance of the resin composition. As the weather resistant anti-aging agents, benzotriazole-based compounds and amine-based compounds (hindered amine-based compounds) are preferred.

The benzotriazole-based compounds include, for example, 2-(2-hydroxy-5-tert-butylphenyl)-2H-benzotriazole, ester compounds of benzene propanoic acid and 3-(2H-benzotriazol-2-yl)-5-(1,1-dimethylethyl)-4-hydroxy (C7-9 side chain and linear alkyl), mixture of octyl 3-[3-tert-butyl-4-hydroxy-5-(5-chloro-2H-benzotriazol-2-yl) phenyl] propionate and 2-ethylhexyl-3-[3-tert-butyl-4-hydroxy-5-(5- chloro-2H-benzotriazol-2-yl) phenyl] propionate, 2-(2H-benzotriazol-2-yl)-4,6-bis(1-methyl-1-phenylethyl) phenol, 2-(2H-benzotriazol-2-yl)-6-(1-methyl-1-phenylethyl)-4-(1,1,3,3-tetramethylbutyl) phenol, reaction product of methyl-3-(3-(2H-benzotriazol-2-yl)-5-t-butyl-4-hydroxyphenyl) propionate/polyethylene glycol 300, 2-(2H-benzotriazol-2-yl)-p-cresol, 2-(2H-benzotriazol-2-yl)-4-6-bis(1-methyl-1-phenylethyl) phenol, 2-[5-chloro(2H)-benzotriazol-2-yl]-4-methyl-6-(tert-butyl) phenol, 2-(2H-benzotriazol-2-yl)-4,6-di-tert-pentylphenol, 2-(2H-benzotriazol-2-yl)-4-(1,1,3,3-tetramethylbutyl) phenol, 2,2'-methylene bis[6-(2H-benzotriazol-2-yl)-4-(1,1,3,3-tetramethylbutyl) phenol], 2-(2H-benzotriazol-2-yl)-6-dodecyl-4-methylphenol, 2-[2-hydroxy-3-(3,4,5,6-tetrahydrophthalimido-methyl)-5-methylphenyl] benzotriazole, 2,2'-methylene bis[6-(benzotriazol-2-yl)-4-tert-octylphenol], and the like.

The amine-based compounds include, for example, bis(1,2,2,6,6-pentamethyl-4-piperidinyl) [[3,5-bis(1,1-dimethylethyl)-4-hydroxyphenyl] methyl] butylmalonate, mixture of bis(1,2,2,6,6-pentamethyl-4-piperidyl) sebacate and methyl 1,2,2,6,6-pentamethyl-4-piperidyl sebacate, bis(2,2,6,6-tetramethyl-4-piperidyl) sebacate, N,N'-bis(2,2,6,6-tetramethyl-4-piperidyl)-N,N'-diformylhexamethylenediamine, poly[{6-(1,1,3,3-tetramethylbutyl) amino-1,3,5-triazine-2,4-diyl} {2,2,6,6-tetramethyl-4-piperidyl) imino} hexamethylene{(2,2,6,6-tetramethyl-4-piperidyl) imino}], tetrakis(1,2,2,6,6-pentamethyl-4-piperidyl) butane-1,2,3,4-tetracarboxylate, tetrakis(2,2,6,6-tetramethyl-4-piperidyl) butane-1,2,3,4-tetracarboxylate, reaction product of 1,2,2,6,6-pentamethyl-4-piperidiole and β,β,β',β'-tetramethyl-2,4,8,10-tetraoxaspiro[5.5] undecane-3,9-diethanol, reaction product of 2,2,6,6-tetramethyl-4-piperidiole and β,β,β',β'-tetramethyl-2,4,8,10-tetraoxaspiro[5.5] undecane-3,9-diethanol, bis(1-undecanoxy-2,2,6,6-tetramethylpiperidin-4-yl) carbonate, 1,2,2,6,6-pentamethyl-4-piperidyl methacrylate, 2,2,6,6-tetramethyl-4-piperidyl methacrylate, and the like.

The addition of the weather resistant anti-aging agents to the resin composition improves the weather resistance of the resin composition, and the non-pneumatic tire using such resin composition as a skeletal member can maintain the desired properties over a long period of time. The amount of the weather resistant anti-aging agents added is preferably in the range of 1 to 5 parts by mass per 100 parts by mass of the resin component of the resin composition.

The heat resistant anti-aging agents are additives that acts to improve the heat resistance of the resin composition. As the heat resistant anti-aging agents, phenol-based compounds (hindered phenol-based compounds) are preferred. The phenol-based compounds include, for example, 2,6-di-tert-butyl-4-methylphenol, n-octadecyl-3-(3,5-di-tert-butyl-4-hydroxyphenyl) propionate, tetrakis[methylene-3-(3,5-di-tert-butyl-4-hydroxyphenyl) propionate] methane, 2,4-di-tert-butyl-6-methylphenol, 1,6-hexanediol-bis-[3-(3,5-di-tert-butyl-4-hydroxyphenyl) propionate], tris(3,5-di-tert-butyl-4-hydroxybenzyl)-isocyanurate, 1,3,5-trimethyl-2,4,6-tris(3,5-di-tert-butyl-4-hydroxybenzyl) benzene, pentaerythritol tetrakis[3-(3,5-di-tert-butyl-4-hydroxyphenyl) propionate], 3,9-bis-[2-[3-(3-tert-butyl-4-hydroxy-5-methylphenyl)-propionyloxy]-1,1-dimethylethyl]-2,4,8,10-tetraoxaspiro[5.5] undecane, triethylene glycol bis[3-(3-t-butyl-5-methyl-4-hydroxyphenyl) propionate], 2,2'-butylidene bis(4,6-di-tert-butylphenol), 4,4'-butylidenebis (3-methyl-6-tert-butylphenol), 2,2'-methylene bis(4-methyl-6-tert-butylphenol), 2,2'-methylene bis(4-ethyl-6-tert-butylphenol), 2-tert-butyl-6-(3-tert-butyl-2-hydroxy-5-methylbenzyl)-4-methylphenol acrylate, 2-[1-(2-hydroxy-3,5-di-tert-pentylphenyl)ethyl]-4,6-di-tert-pentylphenyl acrylate, 4,4'-thiobis(3-methyl-6-tert-butylphenol), 2-tert-butyl-4-methylphenol, 2,4-di-tert-butylphenol, 2,4-di-tert-pentylphenol, 4,4'-thiobis(3-methyl-6-tert-butylphenol), 4,4'-butylidene bis(3-methyl-6-tert-butylphenol), bis-[3,3-bis-(4'-hydroxy-3'-tert-butylphenyl)-butanoic acid]-glycol ester, N,N'-hexamethylene bis[3-(3,5-di-tert-butyl-4-hydroxyphenyl) propanamide], and the like.

The addition of the heat resistant anti-aging agents to the resin composition improves the heat resistance of the resin composition, and the non-pneumatic tire using such resin composition as a skeletal member can maintain the desired properties over a long period of time. The amount of the heat resistant anti-aging agents added is preferably in the range of 1 to 5 parts by mass per 100 parts by mass of the resin component of the resin composition.

The moisture/heat resistant additives are additives that act to improve the moisture/heat resistance of the resin composition. As the moisture/heat resistant additives, carbodiimide compounds and epoxy compounds are preferred, and the epoxy compounds are more preferred.

The carbodiimide compounds can be any compounds having one or more carbodiimide groups in its molecule. The carbodiimide compounds include, for example, monofunctional carbodiimide compounds such as N,N'-diisopropylcarbodiimide, N,N'-di(o-toluyl)carbodiimide, N,N'-dicyclohexylcarbodiimide, N, N'-bis(2,6-diisopropylphenyl) carbodiimide; bifunctional carbodiimide compounds such as p-phenylene-bis(2,6-xylylcarbodiimide), p-phenylene-bis(t-butylcarbodiimide), p-phenylene-bis(mesitylcarbodiimide), tetramethylene-bis(t-butylcarbodiimide), cyclohexane-1,4-bis(methylene-t-butylcarbodiimide); polyfunctional carbodiimide compounds such as condensation products of isocyanate monomer, and the like. Among these, the polyfunctional carbodiimide compounds is preferred. Here, the polyfunctional carbodiimide compound refers to a compound having two or more carbodiimide groups. The polyfunctional carbodiimide compounds include, for example, Carbodilite LA-1 (Nisshinbo Inc.), Carbodilite HMV-8CA (Nisshinbo Inc.), Carbodilite HMV-15CA (Nisshinbo Inc.), Elastostab H01 (Nisshinbo Inc.), Stabaxol P (Rhein Chemie), and other commonly known polyfunctional carbodiimide compounds. One or more of these carbodiimide compounds can be used.

In addition, the epoxy compounds include, specifically, epoxidized soybean oil, epoxidized linseed oil, phenyl glycidyl ether, allyl glycidyl ether, tert-butylphenyl glycidyl ether, 3,4-epoxy cyclohexyl methyl-3',4'-epoxycyclohexyl carboxylate, 3,4-epoxy-6-methylcyclohexylmethyl-3',4'-epoxy-6'-methylcyclohexyl carboxylate, 2,3-epoxycyclohexylmethyl-3',4'-epoxycyclohexyl carboxylate, 4-(3,4-epoxy-5-methylcyclohexyl) butyl-3',4'-epoxycyclohexyl carboxylate, 3,4-epoxycyclohexyl ethylene oxide, cyclohexyl methyl-3,4-epoxycyclohexyl carboxylate, 3,4-epoxy-6-methylcyclohexylmethyl-6'-methylcyclohexyl carboxylate, bisphenol A diglycidyl ether, tetrabromobisphenol A glycidyl ether, diglycidyl esters of phthalic acid, diglycidyl esters of hexahydrophthalic acid, bis-epoxy dicyclopentadienyl ether, bis-epoxy ethylene glycol, bis-epoxycyclohexyl adipate, butadiene diepoxide, tetraphenylethylene epoxide, octyl epoxy tallate, epoxidized polybutadiene, 3,4-dimethyl-1,2-epoxycyclohexane, 3,5-dimethyl-1,2-epoxycyclohexane, 3-methyl-5-tert-butyl-1,2-epoxycyclohexane, octadecyl-2,2-dimethyl-3,4-epoxycyclohexyl carboxylate, n-butyl-2,2-dimethyl-3,4-epoxycyclohexyl carboxylate, cyclohexyl-2-methyl-3,4-epoxycyclohexyl carboxylate, n-butyl-2-isopropyl-3,4-epoxy-5-methylcyclohexyl carboxylate, octadecyl-3,4-epoxycyclohexyl carboxylate, 2-ethylhexyl-3',4'-epoxycyclohexyl carboxylate, 4,6-dimethyl-2,3-epoxycyclohexyl-3',4'-epoxycyclohexyl carboxylate, 4,5-epoxy-tetrahydrophthalic anhydride, 3-tert-butyl-4,5-epoxy-tetrahydrophthalic anhydride, diethyl-4,5-epoxy-cis-1,2-cyclohexyl dicarboxylate, di-n-butyl-3-tert-butyl-4,5-epoxy-cis-1,2-cyclohexyl dicarboxylate, and the like. One or more of these epoxy compounds can be used.

The addition of the moisture/heat resistant additives to the resin composition improves the heat resistance of the resin composition, and the non-pneumatic tire using such resin composition as a skeletal member can maintain the desired properties over a long period of time. The amount of the moisture/heat resistant additives added is preferably in the range of 1 to 15 parts by mass per 100 parts by mass of the resin component of the resin composition.

The bending modulus of elasticity of the resin composition used for the skeletal member at each temperature can be adjusted to the desired range by adjusting the type and ratio of the resin components used and the type and amount of the additive agents added. For example, when a thermoplastic elastomer having a hard segment and a soft segment in its molecule is used as a resin component of the resin composition, selecting one with a high ratio of hard segment in the molecule can increase the bending modulus of elasticity of the resin composition at each temperature, while selecting one with a high ratio of soft segment in the molecule can decrease the bending modulus of elasticity of the resin composition at each temperature.

The method of preparing the resin composition is not limited, and the resin composition may be prepared by mixing the resin component and then adding the additives, by mixing the resin component and the additives at once, by mixing several resin components to which the additives have been pre-mixed, or by mixing the resin component to which the additives have been added with the resin component to which no additives have been added.

The resin composition can be processed into skeletal members of desired shapes using various molding methods. Here, injection molding is preferred as the molding method.

In one embodiment of this disclosure, the aforementioned non-pneumatic tire comprises: an inner rim mounted on a wheel; an outer rim surrounding the inner rim from the outside in the tire radial direction; a plurality of connecting members arranged between the inner rim and the outer rim along the tire circumferential direction to connect these rims; and a tread member provided on the outside in the tire radial direction of the outer rim, wherein the inner rim, the outer rim and the connecting members as the skeletal member are made of the aforementioned resin composition. In this case, a non-pneumatic tire with good ride comfort and excellent durability can be obtained.

Next, a configuration of the non-pneumatic tire according to one embodiment of the present disclosure will be described.

FIG. 1 is a schematic illustration of the configuration of the non-pneumatic tire according to one embodiment of the present disclosure, viewed from the side of the tire. In each drawing used in the following explanation, the scale has been changed as necessary to make each component recognizable.

As illustrated in FIG. 1, the non-pneumatic tire 1 according to this embodiment comprises: an inner rim 2 mounted on a wheel (not illustrated); an outer rim 3 surrounding the inner rim 2 from the outside in the tire radial direction; a plurality of elastically deformable connecting members 4 arranged between the inner rim 2 and the outer rim 3 along the tire circumferential direction to connects the inner rim 2 and the outer rim 3 so that they can be relatively displaced. The tread member 5 is fitted to the outer peripheral surface of the outer rim 3.

This non-pneumatic tire 1 is used on wheelchairs (especially, electric wheelchairs), bicycles, motorcycles, golf carts, and automobiles, etc., (hereinafter collectively referred to as simply vehicles).

Here, the inner rim 2, the outer rim 3, and the tread member 5 are formed in a ring shape, and their respective central axes are located on a common axis. In this specification, this common axis is referred to as the central axis O, and the direction along the central axis O is referred to as the tire width direction. In addition, in the lateral view from the tire width direction, the direction circumferentially around the central axis O is called the tire circumferential direction, and the direction perpendicular to this central axis O is called the tire radial direction.

A tire diameter D in the tire radial direction of the non-pneumatic tire 1 according to this embodiment is 35 cm or less, preferably 32 cm or less, more preferably 30 cm or less, and preferably 10 cm or more, more preferably 12 cm or more. The tire with the tire diameter D in the radial direction of 35 cm or less is lightweight and suitable, for example, for wheelchairs (especially, electric wheelchairs). In addition, the tire is highly durable when the tire diameter D in the tire radial direction is 10 cm or more.

The non-pneumatic tire 1 according to this embodiment is preferred to be used at a driving speed of 30 km/h or less, and more preferred to be used at a driving speed of 15 km/h or less and 5 km/h or more. This non-pneumatic tire 1 has good ride comfort and durability even when used at a driving speed of 30 km/h or less. The non-pneumatic tire 1, which has good ride comfort and durability when used at travel speeds of 30 km/h or less, is suitable, for example, for wheelchairs (especially, electric wheelchairs).

The inner rim 2 is attached to the axle of the vehicle (not illustrated) via wheels. Metal materials such as aluminum, aluminum alloy, and steel can be used as the material for the wheels and axles. The central axes of the inner rim 2 and the outer rim 3 are coaxial with the central axis O. The inner rim 2, the outer rim 3, and the connecting members 4 are positioned in the tire width direction with their respective centers in the tire width direction coinciding with each other.

In this embodiment, the inner rim 2, the outer rim 3, and the connecting members 4 are integrally formed from a resin composition. This allows the inner rim 2, the outer rim 3, and the connecting members 4 to be molded by injection molding, which is suitable for mass production.

Note, the inner rim 2, the outer rim 3, and the connecting members 4 may be formed separately.

The tread member 5 is formed, for example, of vulcanized rubber, which is vulcanized from a rubber composition including natural rubber and the like, or a thermoplastic material, etc. The thermoplastic material includes, for example, a thermoplastic resin such as polyurethane resin, polyolefin resin, polyvinyl chloride resin, and polyamide resin. From the standpoint of the wear resistance, it is preferable that the tread member 5 is formed of vulcanized rubber. In this embodiment, an adhesive layer (not illustrated) is provided between the outer rim 3 and the tread member 5 to involves adhesion between the outer rim 3 and the tread member 5. Commercially available adhesives can be used for this adhesive layer. For example, cyanoacrylate adhesives or epoxy adhesives can be mentioned, and specifically Aron Alpha EXTRA 2000 (manufactured by Toa-Gosei Co., Ltd.) can be mentioned, but not limited to these.

The connecting members 4 are formed as a whole in the shape of a curved rectangular plate, with the front and back surfaces facing the tire circumferential direction and the sides facing the tire width direction. The connecting members 4 are formed of an elastically deformable material and connect the outer peripheral surface side of the inner rim 2 and the inner peripheral surface side of the outer rim 3 so that they can be relatively elastically displaced. A plurality of connecting members 4 are arranged at equal intervals in the circumferential direction of the tire. In FIG. 1, the number of connecting members 4 is 30, however the number of connecting members 4 is not limited to this number in the non-pneumatic tire of this disclosure.

Each of the plurality of connecting members 4 has an inner part 4*a* that is connected to the inner rim 2 and an outer part 4*b* that is connected to the outer rim 3. The inner part 4*a* and the outer part 4*b* are connected to each other in the center of the connecting member 4 in the tire radial direction. When the vehicle is running, the connecting members 4 are elastically deformed by the load to absorb vibrations transmitted from the ground to the vehicle.

In the non-pneumatic tire according to this embodiment, the skeletal member corresponds to the inner rim 2, the outer rim 3, and the connecting members 4 of the non-pneumatic tire 1; and the inner rim 2, the outer rim 3, and the connecting members 4 are composed of the above-mentioned resin composition, that is, a resin composition having a bending modulus of elasticity of 247 MPa or less at −20° C. in accordance with ISO 178 and a bending modulus of elasticity of 32 MPa or more at 60° C. in accordance with ISO 178.

As described above, when the vehicle is running, the load causes the connecting members 4 to deform elastically to absorb vibrations transmitted from the ground to the vehicle, and at this time, adjacent connecting members 4 may rub against each other. The resin composition described above (i.e., a resin composition having a bending modulus of elasticity of 247 MPa or less at −20° C. in accordance with ISO 178 and a bending modulus of elasticity of 32 MPa or more at 60° C. in accordance with ISO 178) can prevent adjacent connecting members 4 from rubbing against each other to be damaged. As a result, the durability of the non-pneumatic tire 1 can be improved.

Therefore, by forming the inner rim 2, the outer rim 3, and the connecting members 4 as a skeletal member from the resin composition described above, it is possible to provide a non-pneumatic tire that offers both ride comfort and durability over a wide temperature range, even when the tire diameter D in the tire radial direction is as small as 35 cm or less.

The non-pneumatic tire 1 according to this embodiment requires that the inner rim 2, the outer rim 3, and the connecting members 4 be made of the resin composition described above, however different resin compositions may be used for each of the inner rim 2, the outer rim 3, and the connecting members 4, which constitute the skeletal member.

EXAMPLES

The present disclosure is described in more detail below with Examples, however this disclosure is not limited in any way to the following Examples.

Examples 1 to 6 and Comparative Examples 1 to 2

The bending modulus of elasticity was measured for the resin compositions provided in Table 1 by the following method.

<Bending Modulus of Elasticity>

The bending modulus of elasticity of the resin compositions other than Example 1 was measured at −20° C., 0° C., 23° C., 40° C., and 60° C. by a three-point bending test in accordance with ISO 178. The bending modulus of elasticity of Example 1 was inferred from the results of Comparative Examples 1 and 2, Examples 2 to 6, and the composition of the resin.

Next, the sample non-pneumatic tires were made using the resin compositions provided in Examples 2 and 5. Each sample non-pneumatic tire had a tire diameter D in the tire radial direction (outer diameter of the tread member 5) of 23.4 cm, an outer diameter of the outer rim 2 of 23.0 cm, an inner diameter of the inner rim 3 of 14.9 cm, and a width in the tire width direction (width of the outer rim 2, the inner rim 3, and the connecting members 4) of 5.6 cm. The structures of those sample non-pneumatic tires are similar to the schematic illustration in FIG. 1.

For each of the sample non-pneumatic tires, only the materials composing the inner rim 2, the outer rim 3, and the connecting members 4 were different from each other, while the other members were similar to each other. The types and contents of the resin compositions that compose the inner rim 2, the outer rim 3, and the connecting members 4 are provided in Table 1.

The initial durability and the ride comfort of each of the sample non-pneumatic tires produced were evaluated or predicted by the following methods.

<Initial Durability Evaluation Method>

The initial durability was evaluated by measuring the distance traveled to failure for each sample tire of Examples 2 and 5, when protrusions of 10 mm wide and 5 mm high were attached to a drum durability tester and a constant load was applied at 15 km/h in a 20° ° C. environment. For Comparative Examples 1, 2 and Examples 1, 3, 4, 6, the initial durability of non-pneumatic tires with a similar configuration was predicted based on the bending modulus of elasticity of each resin provided in Table 1 and the evaluation of the non-pneumatic tires of Examples 2 and 5. The results were classified according to the following criteria. The evaluation criteria are listed below.

If the mileage is 5000 km or more: ○

If the mileage is less than 5000 km: ×

Note that, for Comparative Example 2, spoke-to-spoke contact was predicted from the bending modulus of elasticity and the distance between spokes per load, therefore it was evaluated as spoke contact occurred.

<Ride Comfort Evaluation Method>

Ride comfort was evaluated based on the respective vibration values measured when the sample tires of Example 5 were mounted on a vehicle and driven at 10 km/h on a dry road surface in an environment of 8 to 9° C. and 25 to 30° C., respectively. For Example 2, ride comfort was evaluated based on the vibration values measured when the tires with the same configuration as of Example 5 were mounted on a vehicle and driven at 10 km/h on a dry road surface in an environment of 25 to 30° C. Note that for the vibration values, accelerometers were placed at the feet of passengers in the vehicle, and the vibration was measured when driving on an asphalt pavement. The amplitude of the vibration was squared to a positive value, then averaged and remove the square root to obtain the value (RMS value), and that value was recorded. The ride comfort of Comparative Examples 1, 2 and Examples 1, 2, 3, 4, 6 in the environment of 8 to 9° C. were evaluated based on the vibration values predicted by a linear equation, using the bending modulus of elasticity and the rate of change of vibration values. These were calculated from; the bending modulus of elasticity at 9° C. predicted from the measured vibration values for the non-pneumatic tire of Example 5 and the bending modulus of elasticity listed in Table 1, and the bending modulus of elasticity at 27° C. predicted from the measured vibration values for the non-pneumatic tires of Examples 2 and 5 at 25 to 30° C. and the bending modulus listed in Table 1. For the ride comfort of Comparative Example 1 and Examples 1, 3, 4, 6 in the environment of 25 to 30° C., based on the bending modulus of elasticity of each resin provided in Table 1 and the evaluation of non-pneumatic tire of Examples 2 and 5, the ride comfort of non-pneumatic tires that would have been made with a similar configuration were predicted. Indexes where the vibration value of Comparative Example 1 is 100 are shown in Table 1, respectively. A smaller index indicates better ride comfort. With respect to Comparative Example 2, spoke-to-spoke contact was predicted from the bending modulus of elasticity and the distance between spokes per load, therefore a vibration value was not measured.

TABLE 1

| | | | | Comparative Example 1 | Comparative Example 2 | Example 1 | Example 2 | Example 3 | Example 4 | Example 5 | Example 6 |
|---|---|---|---|---|---|---|---|---|---|---|---|
| Formulation | Polymer | TPC-1 *1 | Mass part | 50 | — | 25 | — | — | — | — | — |
| | | TPC-2 *2 | | 50 | — | 75 | — | — | — | — | — |
| | | TPC-3 *3 | | — | — | — | 100 | 50 | — | — | — |
| | | TPC-4 *4 | | — | — | — | — | 50 | 50 | — | — |
| | | TPC-5 *5 | | — | — | — | — | — | 50 | 100 | 50 |
| | | TPC-5 *6 | | — | 100 | — | — | — | — | — | 50 |
| Characteristic | Bending modulus of elasticity | Bending modulus of elasticity at −20° C. | MPa | 304 | 80 | 234 | 163 | 125 | 92 | 91 | 83 |
| | | Bending modulus of elasticity at 0° C. | | 192 | 58 | 159 | 125 | 95 | 79 | 75 | 61 |
| | | Bending modulus of elasticity at 23° C. | | 140 | 49 | 127 | 109 | 91 | 65 | 64 | 53 |
| | | Bending modulus of elasticity at 40° C. | | 108 | 36 | 96 | 84 | 64 | 53 | 44 | 40 |
| | | Bending modulus of elasticity at 60° C. | | 91 | 30 | 78 | 65 | 54 | 41 | 39 | 34 |
| Evaluation | Durability | Initial durability evaluation results | — | ○ | Spoke contact | ○ | ○ | ○ | ○ | ○ | ○ |
| | Ride comfort | Vibration evaluation index at 8-9° C. | Index | 100 | 69 | 93 | 86 | 79 | 74 | 73 | 70 |
| | | Vibration evaluation index at 25-30° C. | Index | 100 | Spoke contact | 96 | 92 | 85 | 79 | 78 | 75 |

*1 TPC-1: Polyester-based thermoplastic elastomer in which the hard segment is polybutylene terephthalate. The product name is "PELPRENE P150B" manufactured by Toyobo Co., Ltd.
*2 TPC-2: Polyester-based thermoplastic elastomer in which the hard segment is polybutylene terephthalate. The product name is "PELPRENE P90B" manufactured by Toyobo Co., Ltd.
*3 TPC-3: Polyester-based thermoplastic elastomer in which the hard segment is polybutylene terephthalate. Resin whose bending modulus of elasticity is equivalent to that of the product named "PELPRENE P90B" manufactured by Toyobo Co., Ltd.
*4 TPC-4: Polyester-based thermoplastic elastomer in which the hard segment is polybutylene terephthalate. Resin whose bending modulus of elasticity is equivalent to that of the product named "PELPRENE P70B" manufactured by Toyobo Co., Ltd.
*5 TPC-5: Polyester-based thermoplastic elastomer in which the hard segment is polybutylene terephthalate. Resin whose bending modulus of elasticity is equivalent to that of the product named "PELPRENE P46D01" manufactured by Toyobo Co., Ltd.
*6 TPC-6: Polyester-based thermoplastic elastomer in which the hard segment is polybutylene terephthalate. Resin whose bending modulus of elasticity is equivalent to that of the product named "PELPRENE P40B" manufactured by Toyobo Co., Ltd.

It can be seen from the Table 1 that Example tires according to this disclosure have high durability and excellent ride comfort.

On the other hand, from Comparative Example 1, it can be seen that if the bending modulus of elasticity at −20° ° C. of the resin composition used for the skeletal member exceeds 247 MPa, the skeletal member becomes too stiff and ride comfort deteriorates.

Also, from Comparative Example 2, it can be seen that if the bending modulus of elasticity at 60° C. of the resin composition used for the skeletal member is less than 32 MPa, ride comfort and initial durability deteriorate.

REFERENCE SIGNS LIST

1: Non-pneumatic tire
2: Inner rim,
3: Outer rim
4: Connecting member
**4*a***: Inner portion
**4*b***: outer portion
5: tread member
O: Central axis
D: Tire diameter in the tire radial direction

The invention claimed is:

1. A non-pneumatic tire using a resin composition as a skeletal member, wherein the resin composition has a bending modulus of elasticity of 125 MPa or less at −20° C. in accordance with ISO 178 and a bending modulus of elasticity of 32 MPa or more and 90 MPa or less at 60° C. in accordance with ISO 178, and a tire diameter in a tire radial direction is 35 cm or less.

2. The non-pneumatic tire according to claim 1, wherein the resin composition contains a thermoplastic elastomer having a hard segment and a soft segment in its molecule.

3. The non-pneumatic tire according to claim 2, wherein the thermoplastic elastomer is a polyester-based thermoplastic elastomer.

4. The non-pneumatic tire according to claim 3, wherein the hard segment of the polyester-based thermoplastic elastomer is polybutylene terephthalate.

5. The non-pneumatic tire according to claim 4, the tire comprising: an inner rim mounted on a wheel; an outer rim surrounding the inner rim from an outside in the tire radial direction; a plurality of connecting members arranged between the inner rim and the outer rim along a tire circumferential direction to connect these rims; and a tread member provided on an outside in the tire radial direction of the outer rim, wherein the inner rim, the outer rim, and the connecting members, as the skeletal member, are made of the resin composition.

6. The non-pneumatic tire according to claim 3, the tire comprising: an inner rim mounted on a wheel; an outer rim surrounding the inner rim from an outside in the tire radial direction; a plurality of connecting members arranged between the inner rim and the outer rim along a tire circumferential direction to connect these rims; and a tread member provided on an outside in the tire radial direction of the outer rim, wherein the inner rim, the outer rim, and the connecting members, as the skeletal member, are made of the resin composition.

7. The non-pneumatic tire according to claim 2, the tire comprising: an inner rim mounted on a wheel; an outer rim surrounding the inner rim from an outside in the tire radial direction; a plurality of connecting members arranged between the inner rim and the outer rim along a tire circumferential direction to connect these rims; and a tread member provided on an outside in the tire radial direction of the outer rim, wherein the inner rim, the outer rim, and the connecting members, as the skeletal member, are made of the resin composition.

8. The non-pneumatic tire according to claim 1, the tire comprising: an inner rim mounted on a wheel; an outer rim surrounding the inner rim from an outside in the tire radial direction; a plurality of connecting members arranged between the inner rim and the outer rim along a tire circumferential direction to connect these rims; and a tread member provided on an outside in the tire radial direction of the outer rim, wherein the inner rim, the outer rim, and the connecting members, as the skeletal member, are made of the resin composition.

* * * * *